United States Patent
Kawashima et al.

(10) Patent No.: US 8,840,307 B2
(45) Date of Patent: Sep. 23, 2014

(54) CONNECTING ROD BEARING

(71) Applicant: Daido Metal Company Ltd., Nagoya (JP)

(72) Inventors: Yuki Kawashima, Inuyama (JP); Motohiko Koushima, Inuyama (JP)

(73) Assignee: Daido Metal Company Ltd., Nagoya-shi (JP)

( * ) Notice: Subject to any disclaimer, the term of this patent is extended or adjusted under 35 U.S.C. 154(b) by 0 days.

(21) Appl. No.: 13/971,135

(22) Filed: Aug. 20, 2013

(65) Prior Publication Data

US 2014/0064645 A1 Mar. 6, 2014

(30) Foreign Application Priority Data

Aug. 31, 2012 (JP) ................... 2012-191297

(51) Int. Cl.
*F16C 33/10* (2006.01)
*F16C 33/04* (2006.01)
*F16C 9/04* (2006.01)
*F16C 3/14* (2006.01)

(52) U.S. Cl.
CPC ............... *F16C 3/14* (2013.01); *F16C 2240/54* (2013.01); *F16C 33/1065* (2013.01); *F16C 33/046* (2013.01); *F16C 9/04* (2013.01); *F16C 2240/42* (2013.01); *F16C 33/1055* (2013.01)
USPC .......................................... 384/288; 384/291

(58) Field of Classification Search
CPC ............... F16C 9/02; F16C 9/04; F16C 33/10; F16C 33/1045; F16C 33/1055
USPC .................... 384/288, 291, 294, 397
See application file for complete search history.

(56) References Cited

U.S. PATENT DOCUMENTS

| | | | |
|---|---|---|---|
| 6,082,904 A * | 7/2000 | Ono et al. ...................... | 384/291 |
| 2010/0119181 A1 | 5/2010 | Ishigo et al. | |
| 2011/0058761 A1 | 3/2011 | Ishigo et al. | |
| 2011/0058762 A1 | 3/2011 | Ishigo et al. | |
| 2011/0305410 A1 * | 12/2011 | Otsuki et al. ................... | 384/397 |

FOREIGN PATENT DOCUMENTS

| | | |
|---|---|---|
| EP | 1911986 | 4/2008 |
| JP | 04-219521 | 8/1992 |
| JP | 08-277831 | 10/1996 |

(Continued)

OTHER PUBLICATIONS

European Search Report dated Nov. 7, 2013 from corresponding European patent application Serial No. EP 13181016.0 (seven pages).

*Primary Examiner* — Phillip A Johnson
(74) *Attorney, Agent, or Firm* — Harness, Dickey & Pierce, P.L.C.

(57) ABSTRACT

According to the invention, there is provided a connecting rod bearing constituted by a half bearing, which has a main cylindrical portion, crush reliefs and a transitional region. The crush relief is formed so that a depth from a virtual inner circumferential surface at a position of an end surface of the half bearing in a circumferential direction is larger than a depth from the virtual inner circumferential surface at a position where the crush relief connects with the transitional region. Further, a plurality of circumferential grooves are provided in the main cylindrical portion to continuously extend in the circumferential direction throughout an entire length of the main cylindrical portion in the circumferential direction, and are continuously provided also in the transitional region.

5 Claims, 7 Drawing Sheets (56) References Cited

FOREIGN PATENT DOCUMENTS

| JP | 2005069283 | 3/2005 |
| JP | 2012-002247 | 1/2012 |
| WO | WO 2007016915 | 2/2007 |

\* cited by examiner

FIG.14

CONNECTING ROD BEARING

BACKGROUND OF THE INVENTION (1) Field of the Invention

The present invention relates to a connecting rod bearing for an internal combustion engine that is configured so that lubrication oil supplied to an inner circumferential surface of a main bearing supporting a crankshaft is supplied to an inner surface of a connecting rod bearing supporting a crankpin portion through an internal lubrication oil path of the crankshaft.

(2) Description of Related Art

A crankshaft of an internal combustion engine is supported at a journal section thereof in a cylinder block lower portion of the internal combustion engine via a main bearing constituted by a pair of half bearings. For the main bearing, lubrication oil which is discharged by an oil pump through a through-hole formed in a wall of the main bearing from an oil gallery formed in a cylinder block wall is fed into a lubrication oil groove formed along an inner circumferential surface of the main bearing. Further, a first lubrication oil path is formed to penetrate the journal section in a diameter direction thereof, so that both end openings of the first lubrication oil path communicate with the lubrication oil groove of the main bearing. Further, a second lubrication oil path passing through a crank arm section is formed to branch from the first lubrication oil path of the journal section, and the second lubrication oil path communicates with a third lubrication oil path formed to penetrate a crankpin in a diameter direction thereof. The lubrication oil fed into the lubrication oil groove formed in the inner circumferential surface of the main bearing through the through-hole from the oil gallery in the cylinder block wall in this manner passes through the first lubrication oil path, the second lubrication oil path and the third lubrication oil path, and is supplied from a discharge port opened at a tail end of the third lubrication oil path to a gap between sliding surfaces of the crankpin and the connecting rod bearing (for example, see JP-A-08-277831).

The lubrication oil fed to the connecting rod bearing through the journal section of the crankshaft from the cylinder block of the internal combustion engine is likely to be accompanied by foreign matters existing in the lubrication oil paths of respective sections. The foreign matters may damage the sliding surface of the connecting rod bearing, if the foreign matters accompany the lubrication oil and are fed to the gap between the sliding surfaces of the crankpin and the connecting rod bearing. Accordingly, the foreign matters entering the gap between the sliding surfaces of the crankpin and the connecting rod bearing need to be quickly discharged to an outside from a sliding surface portion.

Conventionally, as a main bearing and a connecting rod bearing, sliding bearings each composed of a pair of half bearings have been adopted. In the sliding bearing, so-called crush reliefs are formed adjacently to contact surfaces of the half bearings.

A crush relief is a wall thickness-reduced region, which is formed so that a wall thickness of a region adjacent to a circumferential end surface of the half bearing decreases toward the circumferential end surface. The crush reliefs are formed with the objective of absorbing positional displacement and deformation of butting surfaces of the half bearings when the pair of half bearings are assembled (for example, see JP-A-04-219521).

Further, in some cases, a plurality of circumferential grooves which continuously extend in the circumferential directions are formed on inner circumferential surfaces of half bearings constituting a sliding bearing. Such circumferential grooves are formed generally for enhancing oil retainability of lubricating oil in the inner circumferential surface of the half bearing.

Foreign matters sometimes get mixed into the lubricating oil, and the foreign matters which are released to an inner circumferential surface of the connecting rod bearing are readily discharged into a relief gap from the lubricating oil path of the crankpin surface. Some of the discharged foreign matters are discharged to the outside from both end portions in the width direction of the relief gap, but other foreign matters remain and flow to the crankpin rotation forward side by accompanying the crankpin surface.

In the crush relief on the rear side in the crankpin rotational direction, the relief gap gradually becomes narrower toward the front side in the rotational direction. Therefore, the foreign matters contact the crankshaft surface at a portion where the relief gap is narrow, and are forced into the relief surface which is narrowed. The foreign matters forced therein are caught by an inner side surface (edge portion) of the discharge port when the discharge port on the crankpin surface passes, and are dragged to the inner circumferential surface side of the half bearing to cause the problem of damaging the circumferential surface easily.

As a measures dealing with the foreign matters getting mixed into the lubricating oil in a half bearing for a crankshaft of an internal combustion engine in which crush reliefs are formed at both circumferential end portions of the inner circumferential surface, there is the proposal of forming an axial groove at least in a position adjacent to the crush relief formed in the circumferential end portion of the inner circumferential surface of the half bearing located on the rear side in the relative rotational direction of the crankshaft, and to the inner circumferential surface of the half bearing. The axial groove is formed throughout an entire region in the width direction of the inner circumferential surface of the half bearing, and therefore, the foreign matters can be discharged to an outside of the bearing together with the lubricating oil by the axial groove (for example, see JP-A-2012-002247).

When the bearing of JP-A-2012-002247 is applied to the connecting rod bearing for a crankpin of a crankshaft of an internal combustion engine, entry of foreign matters into the inner circumferential surface of a half bearing hardly occurs, but during the operation time of the internal combustion engine, oil leakage to the outside of the bearing from the axial groove is always involved. In the internal combustion engines in which the oil pumps are miniaturized, and the supply amounts of the lubricating oil to the bearings are decreased in recent years, the problem that the oil supply amount to the inner circumferential surface decreases sometimes arises, in the case of the half bearings of JP-A-2012-002247.

BRIEF SUMMARY OF THE INVENTION

Therefore, the present invention has an object to provide a half bearing constituting a connecting rod bearing in which damage to a bearing inner circumferential surface by foreign matters hardly occurs and a leakage amount of lubricating oil can be reduced.

In order to attain the above-described object, a connecting rod bearing of the present invention is a connecting rod bearing which supports a crankpin of an internal combustion engine. In the crankpin, a discharge port which supplies lubricating oil to a gap between the crankpin and the connecting rod bearing is formed, and the connecting rod bearing includes a pair of half bearings which constitute the connecting rod bearing. The half bearing includes a main cylindrical portion formed to include a central portion in a circumferential direction of the half bearing, crush reliefs formed at both end portions in the circumferential direction of the half bearing so that wall thicknesses thereof are smaller than a wall thickness of the main cylindrical portion, and a transitional region formed between at least the crush relief on a rear side in a rotational direction of the crankpin and the main cylindrical portion so that a wall thickness thereof decreases toward the crush relief. The crush reliefs are each formed so that when an inner circumferential surface of the main cylindrical portion is extended above the crush relief to be set as a virtual inner circumferential surface, a depth from the virtual inner circumferential surface at a position of an end surface in the circumferential direction of the half bearing is larger than a depth from the virtual inner circumferential surface at a position connecting to the transitional region. Further, a plurality of circumferential grooves which continuously extend in a circumferential direction throughout an entire length in the circumferential direction are provided in the main cylindrical portion, and the plurality of circumferential grooves are continuously provided also in the transitional region.

The half bearing constituting the connecting rod bearing of the present invention has the main cylindrical portion, the crush reliefs and the transitional region on the rear side in the crankpin rotational direction. The crush reliefs are each formed so that the depth from the virtual inner circumferential surface at the position of the end surface in the circumferential direction of the half bearing is larger than the depth from the virtual inner circumferential surface at the position connecting to the transitional region. Further, a plurality of circumferential grooves which continuously extend in the circumferential direction are provided in the main cylindrical portion throughout the entire length in the circumferential direction, and the plurality of circumferential grooves are continuously provided also in the transitional region.

According to the configuration as above, the oil flow in the opposite direction which is injected from the discharge port of the crankpin works as resistance, and the foreign matters hardly advance into the region where the discharge port passes. Therefore, the problem that the foreign matters are dragged by the edge portion of the discharge port and damage the inner circumferential surface of the half bearing hardly arises. Further, since the configuration does not intend to discharge the foreign matters to the outside of the bearing positively, the leakage amount of the lubricating oil does not increase.

BRIEF DESCRIPTION OF THE SEVERAL VIEWS OF THE DRAWING

FIGS. 8A and 8B are operational views explaining an operation of the half bearing of the embodiment in a state before injection of lubricating oil, while FIG. 8A is a view seen from an inner side, and FIG. 8B is a front view;

FIGS. 9A and 9B are operational views explaining the operation of the half bearing of the embodiment in a state after injection of the lubricating oil, while FIG. 9A is a view seen from the inside, and FIG. 9B is a front view;

FIGS. 11A and 11B are operational views explaining the operation of a half bearing of the prior art in a state before injection of the lubricating oil, while FIG. 11A is a view seen from an inner side, and FIG. 11B is a front view;

FIGS. 12A and 12B are operational views explaining the operation of the half bearing of the prior art in a state immediately after injection of the lubricating oil, while FIG. 12A is a view seen from the inner side, and FIG. 12B is a front view;

FIGS. 13A and 13B are operation views explaining the operation of the half bearings of the prior art in a state in which the discharge port approaches to the other main cylindrical portion, while FIG. 13A is a view seen from an inner side, and FIG. 13B is a front view.

DETAILED DESCRIPTION OF THE INVENTION

Hereinafter, an embodiment of the present invention will be described with reference to the drawings. Note that in order to facilitate understanding, crush reliefs are drawn by being emphasized in the drawings.

[Embodiment]
(Overall Configuration of Bearing Device)

Figure 1:
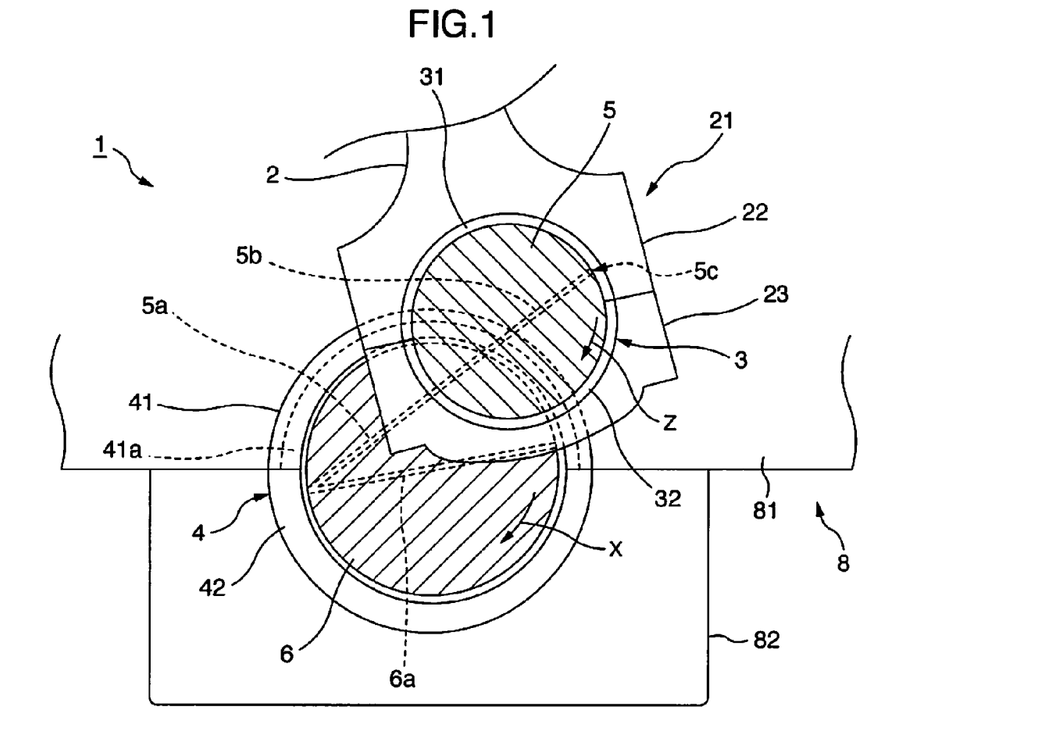
FIG. 1 is a sectional view of a crankshaft of an internal combustion engine which is cut at a journal section and a crankpin section.

As shown in FIG. 1, a bearing device 1 of the present embodiment includes a journal section 6 that is supported at a lower portion of a cylinder block 8, a crankpin 5 that is formed integrally with the journal section 6 and rotates about the journal section 6, and a connecting rod 2 that transmits reciprocating motion from an internal combustion engine to the crankpin 5. The bearing device 1 further includes a main bearing 4 that rotatably supports the journal section 6, and a connecting rod bearing 3 that rotatably supports the crankpin 5, as sliding bearings that support a crankshaft.

Note that the crankshaft has a plurality of journal sections 6 and a plurality of crankpins 5, but in this case, for convenience of explanation, only one journal section 6 and one crankpin 5 are illustrated and described. In FIG. 1, the positional relationship in the sheet in the depth direction is configured such that the journal section 6 is located on the back side of the sheet, and the crankpin 5 is on a front side.

The journal section 6 is pivotally supported at a cylinder block lower portion 81 of the internal combustion engine via the main bearing 4 composed of a pair of half bearings 41 and 42. In the half bearing 41 located at an upper side in FIG. 1, a lubrication oil groove 41a is formed throughout an entire length of an inner circumferential surface. Further, the journal section 6 has a lubrication oil path 6a that penetrates in a diameter direction, and when the journal section 6 rotates in an arrow X direction, both end openings of the lubrication oil path 6a alternately communicate with the lubrication oil groove 41a of the main bearing 4.

The crankpin 5 is pivotally supported by a large end portion housing 21 (a rod side large end portion housing 22 and a cap side large end portion housing 23) of the connecting rod 2 via the connecting rod bearing 3 that is composed of a pair of half bearings 31 and 32.

As described above, for the main bearing 4, lubrication oil that is discharged by an oil pump is fed into the lubrication oil groove 41a that is formed along the inner circumferential surface of the main bearing 4, through a through-hole formed in a wall of the main bearing 4 from an oil gallery formed in a cylinder block wall.

Further, the first lubrication oil path 6a is formed to penetrate in the diameter direction of the journal section 6, and both end openings of the first lubrication oil path 6a communicate with the lubrication oil groove 41a. A second lubrication oil path 5a that branches from the first lubrication oil path 6a of the journal section 6 to pass through a crank arm section (not illustrated) is formed, and the second lubrication oil path 5a communicates with a third lubrication oil path 5b that is formed to penetrate in a diameter direction of the crankpin 5.

In this manner, the lubrication oil passes through the first lubrication oil path 6a, the second lubrication oil path 5a and the third lubrication oil path 5b and is supplied to a gap formed between the crankpin 5 and the connecting rod bearing 3 from a discharge port 5c at an end portion of the third lubrication oil path 5b.

Figure 4:
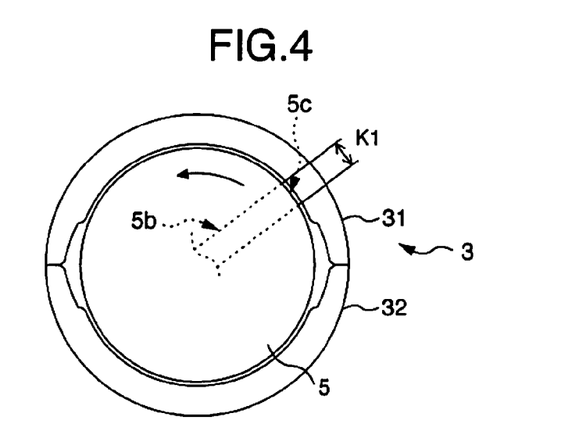
FIG. 4 is a front view of half bearings explaining a discharge port provided at a crankpin.

The discharge port 5c is an opening portion that is provided on a surface of the crankpin 5 to supply the lubrication oil to a gap between the crankpin 5 and the connecting rod bearing 3 as described above, and has a diameter K1 in a circumferential direction on the surface of the crankpin 5 (see FIG. 4).

(Configuration of Half Bearing)

Figure 2:
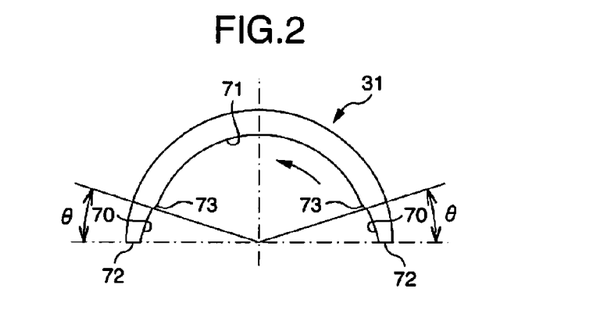
FIG. 2 is a front view of a half bearing of an embodiment.

The connecting rod bearing 3 of the present embodiment is formed by butting end surfaces in a circumferential direction of the pair of half bearings 31 and 32 and combining the half bearings to be in a cylindrical shape as a whole (see FIG. 4). Each half bearing 31 (32) is formed into a semi-cylindrical shape by a bimetal with a thin bearing alloy bonded onto a steel plate as shown in FIG. 2. The half bearing 31 includes a main cylindrical portion 71 formed to include a central portion in the circumferential direction, crush reliefs 70 and 70 formed at both end portions in the circumferential direction, and transitional regions 73 and 73 that are located between the main cylindrical portion 71 and the crush reliefs 70 and 70 and are formed so that wall thicknesses thereof become thinner toward the crush reliefs 70 and 70.

Here, the transitional regions 73 at a rear side in a crankpin rotating direction of the half bearings 31 and 32 are essential components in the present invention, but the transitional regions 73 at a front side are not essential components. However, in the present embodiment, an example including the transitional regions 73 and 73 at both the front side and the rear side is shown. By including the transitional regions 73 and 73 at both sides like this, a worker can be prevented from assembling the half bearing 31 so that the transitional region 73 is located only at the front side in the rotational direction of the crankpin 5 by mistake. Unlike the embodiment, the crush reliefs 70 and the main cylindrical portions 71 may be formed to connect directly to each other without forming the transitional regions 73 at the front side in the rotational direction of the crankpin 5 of the half bearings 31 and 32. Here, "the transitional region 73 at the rear side in the rotational direction of the crankpin 5" means a transitional region 73 through which an arbitrary point on the surface of the rotating crankpin 5 passes during movement from the crush relief 70 to the main cylindrical portion 71, among the transitional regions 73 located in the vicinity of both ends, when attention is focused on one single half bearing 31.

The main cylindrical portion 71 has a semi-cylindrical surface occupying most of the inner circumferential surface of the half bearing 31, and the semi-cylindrical surface forms a main sliding surface between the bearing and a counterpart shaft.

Figure 5:
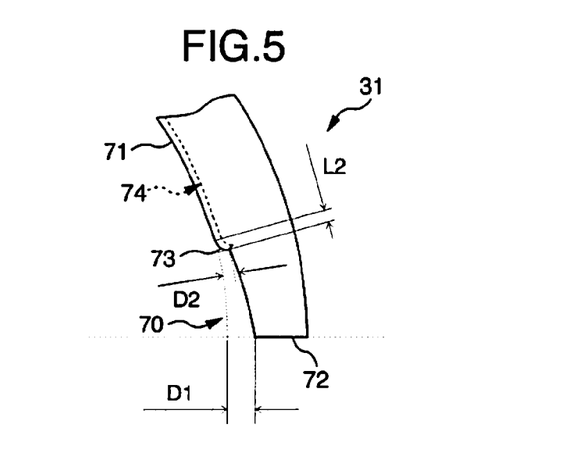
FIG. 5 is an enlarged front view explaining a shape in a vicinity of a crush relief.
Figure 6:
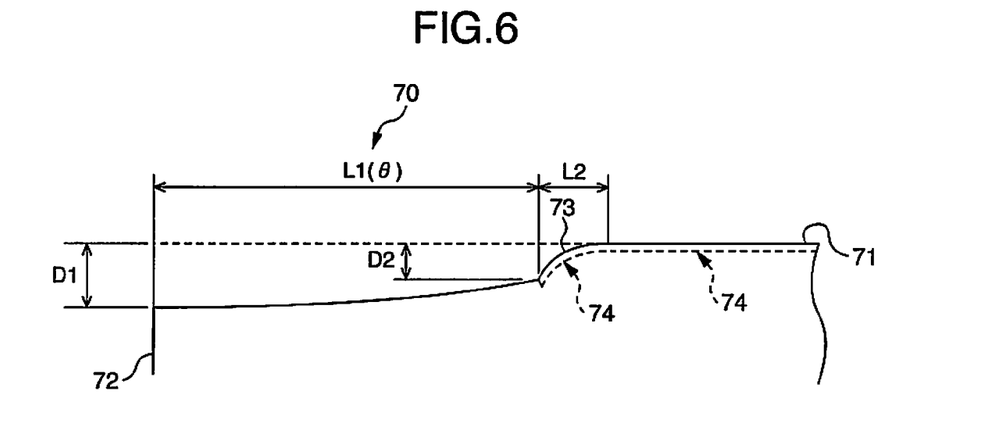
FIG. 6 is a development view explaining specific dimensions by developing a main cylindrical portion into a plane with respect to the shape in the vicinity of the crush relief.

The transitional region 73 with the wall thickness gradually decreasing toward the crush relief 70 is provided adjacently to the main cylindrical portion 71, as shown in FIGS. 5 and 6. In other words, in the transitional region 73, an inclined curved surface (or an inclined plane) is formed to get closer to a counterpart shaft side toward an inner surface of the main cylindrical portion 71 from an inner surface of the crush relief 70.

The transitional region 73 seen from the axial direction of the half bearing 31 is constituted by an inward protruded curved surface that is protruded inward in a radial direction of the half bearing 31. Namely, an inclination of the inclined curved surface of the transitional region 73 to a virtual inner circumferential surface of the half bearing 31 seen from the axial direction of the half bearing 31 is the largest at a position where the transitional region 73 is connected to the crush relief 70, and is the smallest at a position where the transitional region 73 is connected to the main cylindrical portion 71, and the transitional region 73 is smoothly connected to the main cylindrical portion 71.

Note that an inner surface shape of the transitional region 73 only have to have a shape such that at the moment when the discharge port 5c for the lubrication oil on the surface of the crankpin 5 communicates with the transitional region 73, an injection flow (rapid flow) of the lubrication oil flowing into a relief gap (gap formed by the transitional region 73 and the crush relief surface, and the surface of the crankpin 5) in the lubrication oil path 5b is dispersed in a width direction of the half bearing 31. Accordingly, the inner surface shape does not necessarily have to be the shape having an inward protruded curved surface, and may be, for example, a shape having an outward protruded curved surface that is protruded to an outer diameter side, or may be an S-shaped composite curved surface having an outward protruded curved surface at a side near the crush relief 70 and an inward protruded curved surface at a side far from the crush relief 70. Further, the transitional region 73 may be a flat surface instead of a curved surface.

Figure 3:
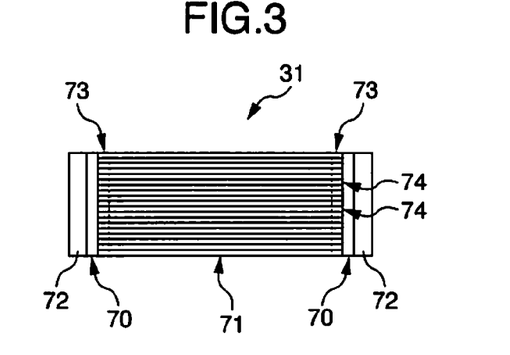
FIG. 3 is a bottom view of the half bearing of the embodiment.

As shown in FIG. 3, in the transitional regions 73 and 73 and the main cylindrical portion 71, a plurality of circumferential grooves 74 are formed throughout entire lengths in a circumferential direction of the transitional regions 73 and 73 and the main cylindrical portion 71 so that the plurality of circumferential grooves 74 extend parallel with the circumferential direction of the bearing. The plurality of circumferential grooves 74 are disposed in parallel in the width direction of the half bearing 31, and are formed throughout the entire width. Accordingly, on the inner circumferential surfaces of the transitional regions 73 and the main cylindrical portion 71, the plurality of circumferential grooves 74 are formed throughout the entire regions thereof, and a flat region is not present.

Figure 7:
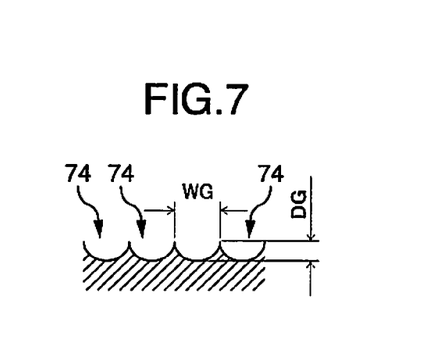
FIG. 7 is a sectional view of a circumferential groove.

Describing in more detail, the circumferential groove 74 is formed into a circular arc shape (shape in which a circular arc portion is on a rear side) with a predetermined groove width WG and a predetermined groove depth DG, as shown in FIG. 7. In other words, the individual circumferential grooves 74 are U-shaped cut grooves, are provided side by side at constant intervals (WG) in the width direction, and form a sectional shape of saw teeth or a shallow comb as a whole. Here, the groove width WG means a distance between vertexes of adjacent crest portions in the width direction of the half bearing 31, and the groove depth DG means a distance from the vertex to a bottom of a trough portion in the vertical direction to the inner circumferential surface. More specifically, the circumferential groove 74 preferably has a groove width WG of 0.05 to 0.5 mm, and a groove depth DG of 0.5 to 6 µm.

The crush relief 70 is a wall thickness-reduced region that is formed in a region adjacent to an end surface 72 (see FIG. 5) in the circumferential direction of the half bearing 31 so that the wall thickness thereof becomes thinner than that of the main cylindrical portion 71. The crush relief 70 is provided with the objective of absorbing positional displacement and deformation of the butting end surfaces (end surfaces 72 in the circumferential direction) in a state in which the pair of half bearings 31 and 32 are assembled to the connecting rod 2.

The crush relief 70 of the present embodiment is formed so that a depth D1 at the position of the end surface 72 is larger than a depth D2 at a position connecting to the transitional region 73, as shown in FIGS. 5 and 6. Here, the depth of the crush relief 70 means a distance from a virtual inner circumferential surface that is the inner circumferential surface of the main cylindrical portion 71 extended on the crush relief 70 to the surface of the crush relief 70.

Further, the crush relief 70 of the present embodiment is constituted by an outward protruded curved surface that is protruded outward in the radial direction of the half bearing 31. Namely, when the crush relief 70 is seen from the axial direction of the half bearing 31, an inclination of the inner surface of the crush relief 70 relative to the virtual inner circumferential surface of the half bearing 31 is the largest at the position connecting to the transitional region 73, and is the smallest at the position of the end surface 72 to be substantially parallel with the virtual inner circumferential surface.

Next, with reference to FIG. 6, specific dimensions of the crush relief 70 and the transitional region 73 will be described. FIG. 6 is a development view in which the inner circumferential surface of the main cylindrical portion 71 is developed into a plane (straight line in the section). The depth D1 of the crush relief 70 can be similar to the depth of the conventional crush relief. For example, the depth D1 is approximately 0.01 to 0.05 mm in the case of the bearing for a compact internal combustion engine for a passenger car, while it may differ depending on the specifications of the internal combustion engine. A length L1 of the crush relief 70 is preferably set at a length of 3 mm or more at the minimum in order to absorb the positional displacement and deformation of the butting end surfaces (end surfaces 72 in the circumferential direction) of the pair of half bearings 31 and 32. Preferably, the crush relief 70 is formed within a range of a maximum circumferential angle θ of 30° or less from the circumferential end portion 72 of the half bearing 31 to the circumferential central portion side (see FIG. 2).

Further, the circumferential length L1 of the crush relief 70 from the circumferential end portion 72 of the half bearing 31 toward the circumferential central portion side is especially preferably 75% or more of the circumferential length K1 of the discharge port 5c for the lubricating oil on the surface of the crankpin 5 (that is, the total length of a pair of crush reliefs on the circumferential end surfaces of the pair of half bearings 31 and 32 is not less than a length corresponding to a length obtained by multiplying the circumferential length K1 of the discharge port 5c for the lubricating oil on the crankpin 5 surface by 1.5).

When the circumferential length L1 of the crush relief 70 is short, some of the foreign matters discharged from the discharge port 5c for the lubricating oil are likely to reach the transitional region 73 adjacent to the crush relief 70 on the rear side in the rotational direction of the crankpin 5 of the other half bearing 32 before the discharge port 5c of the crankpin 5 catches up therewith. However, if the circumferential length L1 of the crush relief 70 has the length corresponding to 75% of the circumferential length K1 of the discharge port 5c for the lubricating oil on the surface of the crankpin 5 or more, such likelihood becomes low. Note that when the transitional region 73 is not formed on the front side in the rotational direction of the crankpin 5 of the half bearing 31, the crush relief 70 is formed to have the length L1 (θ) and the depth D2 of the crush relief 70 similar to the present embodiment.

The depth D2 of the crush relief 70 at a position of connection to the transitional region 73 can be set at 0.005 to 0.030 mm. If the depth D2 is within this range, a sufficient gap is formed between the crush relief and the crankpin 5 surface in the circumferential end portion of the crush relief 70, and therefore, a back flow of the lubricating oil to the crush relief gap is formed at the moment when the discharge port 5c for the lubricating oil of the crankpin 5 communicates with the transitional region 73 at the rear side in the crankpin rotational direction (see FIGS. 9A and 9B). Accordingly, the foreign matters mixed in the lubricating oil can be prevented from being fed to the region to which the discharge port 5c for the lubricating oil of the crankpin 5 advances.

Namely, when the depth D2 is less than 0.005 mm, the gap from the crankpin 5 surface in the circumferential end portion of the crush relief is not sufficiently formed, and therefore, the back flow of the lubricating oil to the crush relief gap during the time after the discharge port 5c for the lubricating oil of the crankpin 5 starts communication with the main cylindrical surface at the rear side in the crankpin rotational direction until the discharge port 5c finishes communication with the transitional region 73 is difficult to form. Meanwhile, when the depth D2 exceeds 0.030 mm, the gap of the crush relief 70 in the end portion in the width direction of the half bearing 31 (the gap sandwiched by the inner surface of the crush relief 70 and the virtual inner circumferential surface) becomes large, and therefore, the leakage amount of the lubricating oil to the outside from both end portions in the width direction of the half bearing 31 becomes large.

A circumferential length L2 of the transitional region 73 is a length corresponding to 5% to 75% of the length of the circumferential length K1 of the discharge port 5c for the internal lubricating oil on the surface of the crankpin 5. The circumferential length K1 of the discharge port 5c is not limited as long as the effect of the present invention is obtained, although it may differ depending on the specifications of the internal combustion engine. (As an example, in the case of a compact internal combustion engine, the length of the discharge port 5c for the lubricating oil on the surface of the crankpin 5 is approximately 4 to 6 mm.)

When the circumferential length L2 of the transitional region 73 is less than 5% of the length of the circumferential length K1 of the discharge port 5c for the lubricating oil on the surface of the crankpin 5, the gap for forming the back flow of the lubricating oil to the relief gap from the discharge port 5c for the lubricating oil cannot be secured.

In contrast with this, when the circumferential length L2 of the transitional region 73 exceeds 75% of the length of the circumferential length K1 of the discharge port 5c for the lubricating oil, if the depth D2 of the transitional region 73 is set at 5 to 30 μm as described above, the inclination of the curved surface of the transitional region 73 relative to the virtual inner circumferential surface of the half bearing 31 seen from the axial direction of the half bearing 31 becomes small and closely analogous thereto, and therefore, the gap (the gap between the surface of the crankpin 5 and the curved surface of the transitional region 73) becomes too narrow. In that case, even if the discharge port 5c on the surface of the crankpin 5 communicates with the transitional region 73, the lubricating oil and the foreign matters inside the oil path are hardly discharged into the gap.

Figure 10:
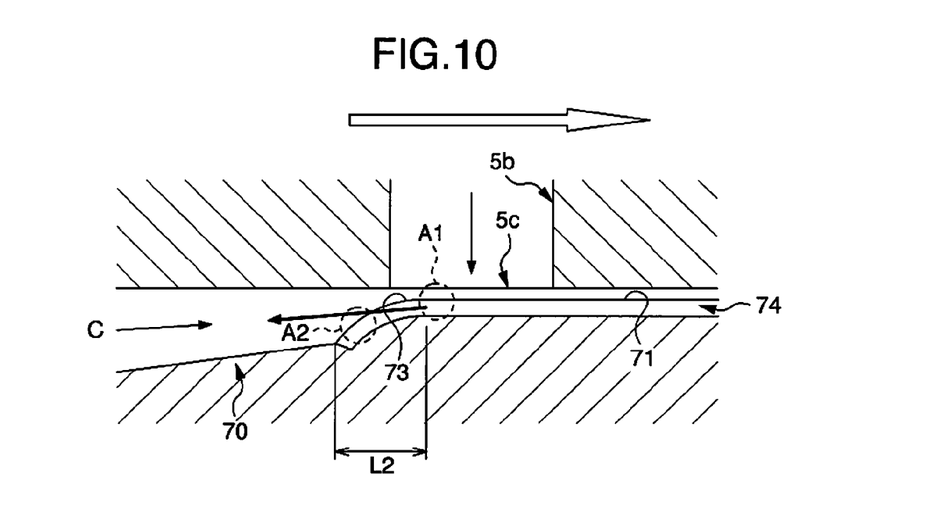
FIG. 10 is an enlarged operation view explaining an operation of the half bearing of the embodiment.
Figure 11A:
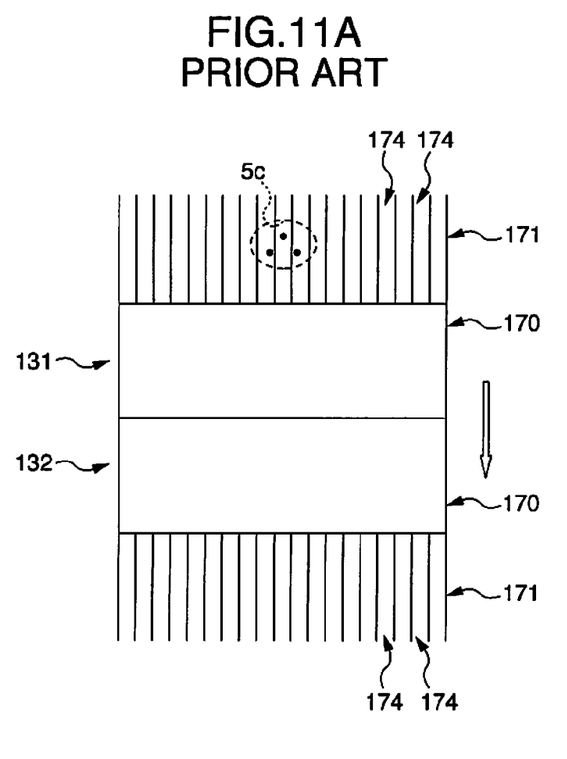
Figure 11B:
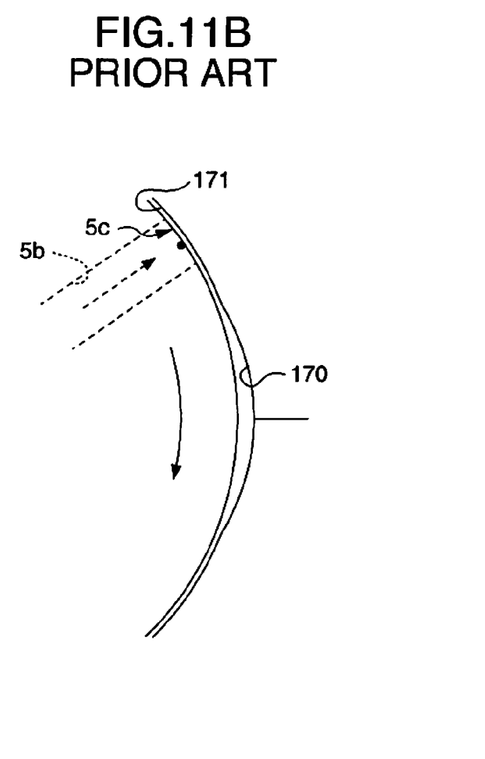
Figure 12A:
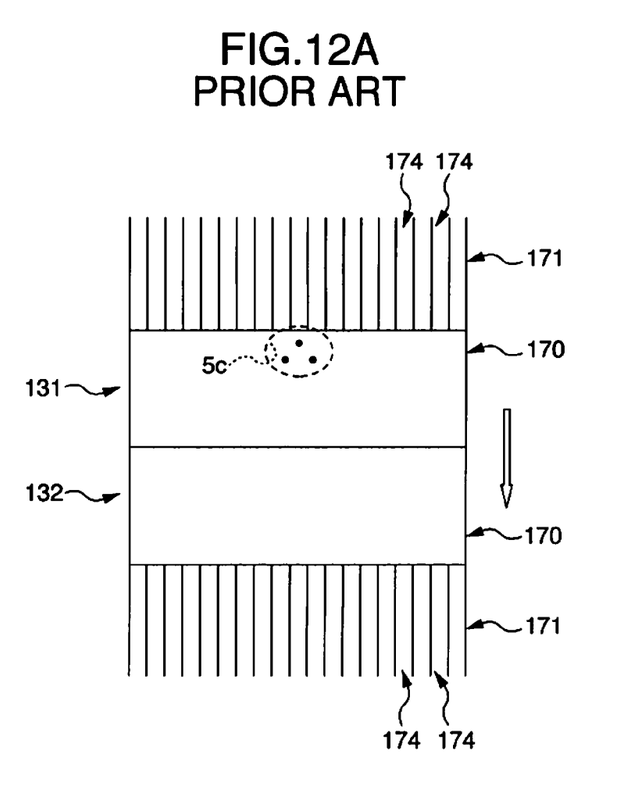
Figure 12B:
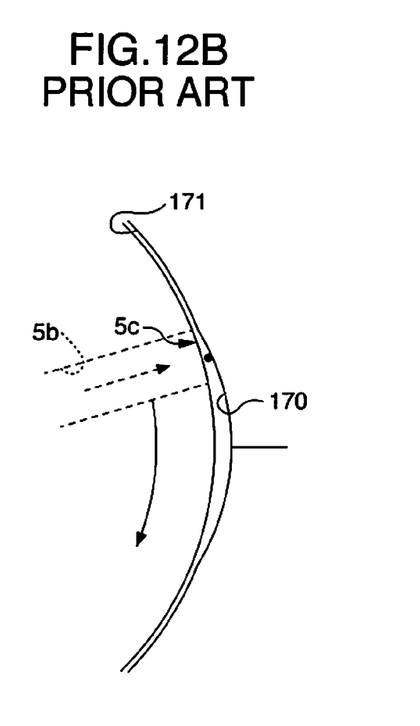
Figure 13A:
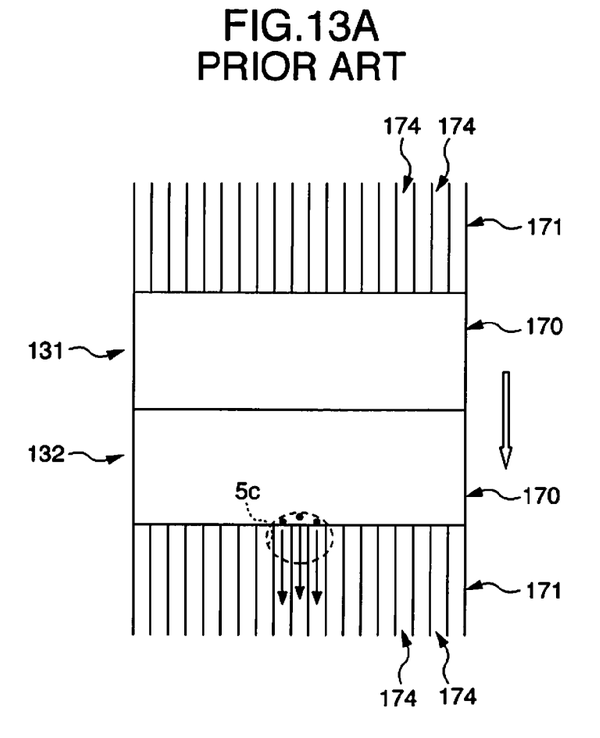
Figure 13B:
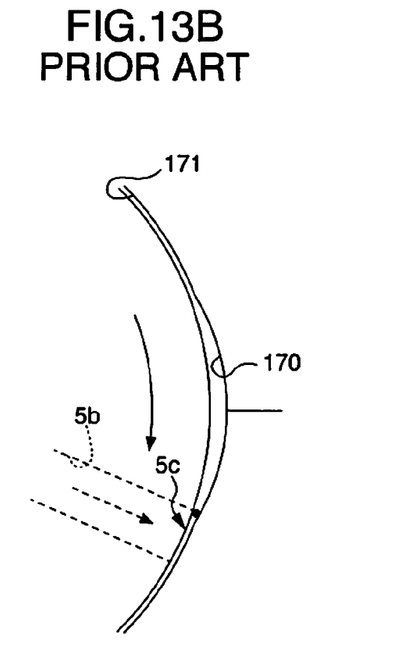

As shown in FIG. 10, the length in the circumferential direction of the transitional region 73 of the present embodiment is smaller than the circumferential length K1 of the discharge port 5c for the lubricating oil in the surface of the crankpin 5. If the transitional region 73 is excessively long, the crush relief 70 side of the transitional region 73 (A2 region in FIG. 10) faces the surface of the crankpin 5 substantially parallel when the discharge port 5c for the lubricating oil on the surface of the crankpin 5 starts to be closed by the bearing inner circumferential surface. In that case, in the region at the crush relief side of the transitional region 73, the oil between the surface of the transitional region 73 and the surface of the crankpin 5 is influenced by the surface of the crankpin 5, and is caused to flow in the circumferential direction by accompanying the surface of the crankpin 5. When the discharge port 5c for the lubricating oil communicates with the inner circumferential surface of the bearing and is sufficiently closed (A1 region of FIG. 10), the gap between the surface of the transitional region 73 and the surface of the crankpin 5 becomes narrow, and the passage for the oil from the internal oil path to the crush relief 70 side becomes too narrow. Therefore, the back flow of the oil to the relief gap side hardly occurs. The length L2 of the transitional region 73 is preferably set at a length of 5 to 75% of the circumferential length K1 of the discharge port 5c for the lubricating oil on the surface of the crankpin 5, and is more preferably set at a length of 10 to 60% thereof.

Note that the shapes of the main cylindrical portion 71, the crush relief 70 and the transitional region 73 described above are measurable by an ordinary shape measuring device, for example, by a roundness measuring device. Namely, the shape of the inner surface of the bearing can be continuously measured in the circumferential direction in a state in which the bearing is assembled to the connecting rod, or a housing similar thereto.

(Operation)

Next, with reference to FIGS. 8 to 14, operation of the half bearing 31 of the present embodiment will be described.

An oil feeding mechanism for the lubrication oil in an internal combustion engine is configured such that the lubrication oil discharged by the oil pump is supplied to the inner circumferential surface of the main bearing 4 that supports the crankshaft, and is further supplied through the internal lubrication oil paths 6a, 5a and 5b of the crankshaft to the inner circumferential surface of the connecting rod bearing 3 that rotatably supports the crankpin 5 that connects the connecting rod 2 and the crankshaft (see FIG. 1).

Figure 8A:
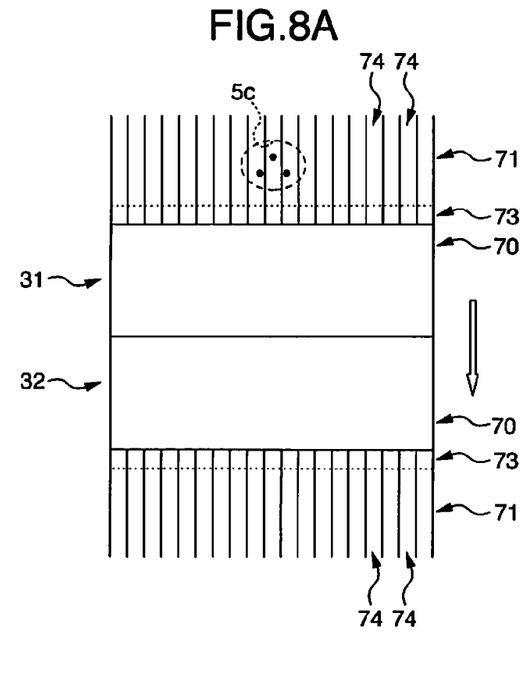
Figure 8B:
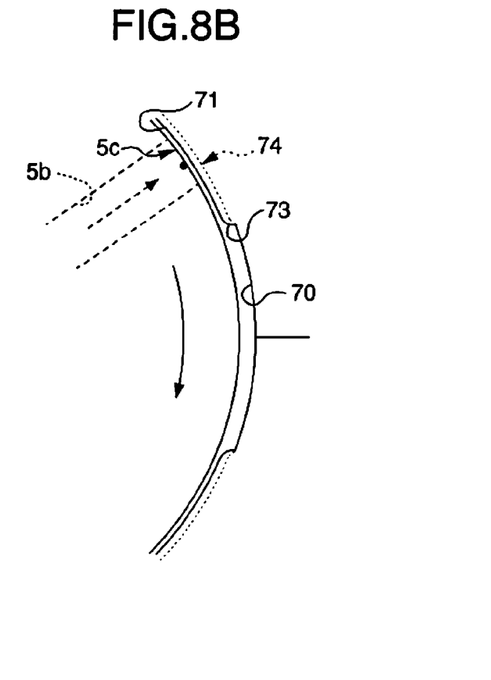

As shown in FIGS. 8A and 8B, while the discharge port 5c for the lubrication oil of the crankpin 5 surface is located at the main cylindrical surface of the half bearing 31, the gap located between the surface of the crankpin 5 and the main cylindrical surface of the half bearing 31 is narrow. Therefore, the amount of the lubrication oil that flows out from the discharge port 5c is small, and the pressure of the lubrication oil in the lubrication oil path 5b is in a high state. Further, the foreign matters that cannot advance into the gap between the surface of the crankpin 5 and the main cylindrical surface of the half bearing 31 remain in the lubrication oil path 5b (see FIG. 1).

Thereafter, when the discharge port 5c for the lubricating oil on the surface of the crankpin 5 and the crush relief 70 on the front side in the crankpin 5 rotational direction of the half bearing 31 communicate with each other, the foreign matters in the internal lubricating oil path 5b of the crankpin 5 are discharged to the crush relief gap together with the lubricating oil.

The inertial force to move in the rotational direction of the crankpin 5 acts on the foreign matters discharged from the discharge port 5c for the lubricating oil of the rotating crankpin 5, and therefore, the foreign matters thereafter move straight forward to the front side in the rotational direction of the crankpin 5 and tend to advance toward the region to which the discharge port 5c for the lubricating oil on the surface of the crankpin 5 advances, on the circumferential end portion side of the crush relief 70 which is located on the rear side in the crankpin 5 rotational direction of the other half bearing 32.

Figure 9A:
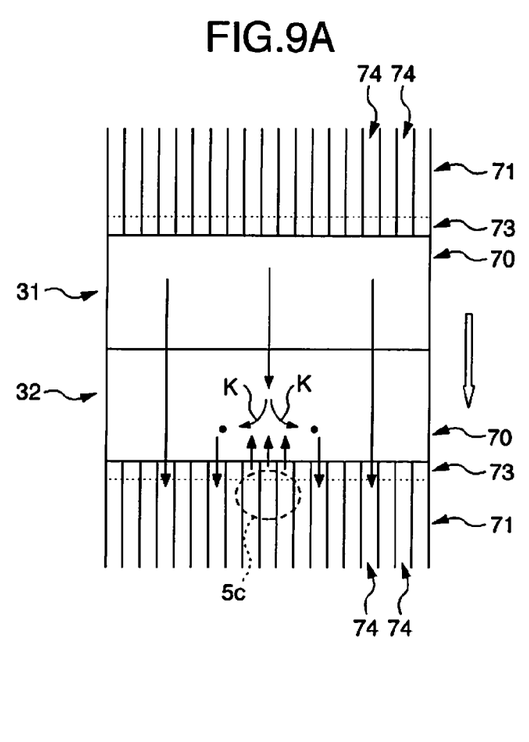
Figure 9B:
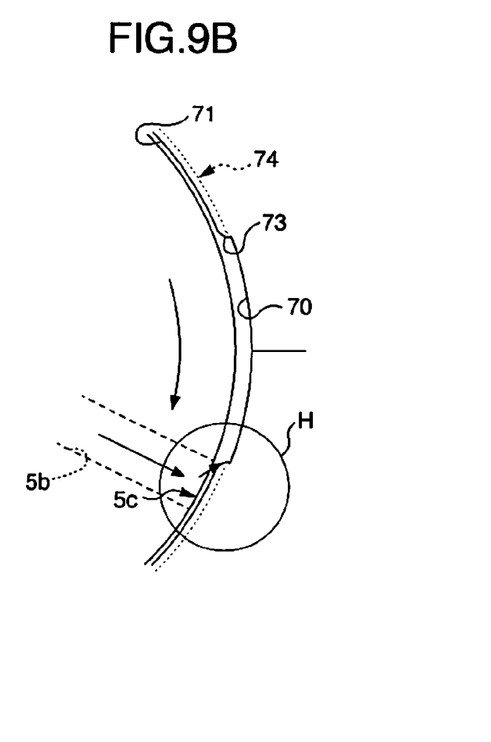

As shown in FIGS. 9A and 9B, during the time period after the discharge port 5c for the lubricating oil on the surface of the crankpin 5 starts communication with the main cylindrical surface of the end portion on the rear side in the crankpin 5 rotational direction of the other half bearing 32 until the discharge port 5c finishes communication with the transitional region 73, an oil flow in the opposite direction from the rotational direction of the crankpin 5 (hereinafter, called "back flow") is formed toward the transitional region 73 and the relief gap side through the discharge port 5c for the lubricating oil.

The back flow becomes resistance to the oil flow which is discharged to the relief gap and thereafter advances toward the transitional region 73 side after the discharge port 5c for the lubricating oil on the surface of the crankpin 5. Therefore, the oil flow in which the foreign matters are mixed flows by avoiding the back flow, so that the foreign matters hardly advance to the region to which the discharge port 5c for the lubricating oil of the crankpin 5 advances. The foreign matters flow by being dispersed to the relief gap other than the region to which the discharge port 5c for the lubricating oil on the surface of the crankpin 5 advances, on the circumferential end portion side of the crush relief 70 which is located on the rear side in the crankpin 5 rotational direction of the half bearing 32.

The reason why the back flow which disperses the foreign matters is formed is as follows. Namely, in the present embodiment, between the main cylindrical portion 71 and the crush relief 70 on the rear side in the crankpin 5 rotational direction of the half bearing 32, or between the main cylindrical portion 71 and the crush reliefs 70 and 70 on both sides, the transitional region 73 formed so that the wall thickness becomes thinner toward the crush relief 70 is provided, and when the inner circumferential surface of the main cylindrical portion 71 is extended onto the crush relief 70 as a virtual inner circumferential surface, the crush relief 70 adjacent to the transitional region 73 is formed so that the depth D1 from the virtual inner circumferential surface at the position of the end surface in the circumferential direction of the half bearing 31 is deeper than the depth D2 from the virtual inner circumferential surface at the position of connection to the transitional region 73.

By adopting the configuration as above, at the end portion of the crush relief 70, the surface of the crush relief 70 and the surface of the crankpin 5 are sufficiently separated from each other, and a sufficient gap (space) is formed. When only the conventional crush relief 70 which will be described later is formed, the oil which flows in the gap at the end portion of the crush relief 70 is dragged by the surface of the rotating crankpin 5, and has the pressure increased by a hydrodynamic wedge action, and therefore, the back flow is difficult to be formed in the relief gap from the discharge port 5c for the lubricating oil on the surface of the crankpin 5. In contrast with this, in the present invention, such a pressure rise hardly occurs in the oil flowing in the end portion of the crush relief 70 (an oil flow C in FIG. 10), and therefore, the back flow can be easily formed.

While the back flow of the lubricating oil occurs in the transitional region 73 in this manner, the recessed portion of the circumferential groove 74 functions as a guide of the back flow. The direction of the back flow opposes the oil flow (containing foreign matters) which flows in the circumferential direction toward the passing range of the discharge port 5c of the crankpin 5 in the relief gap by accompanying the surface of the rotating crankpin 5, and therefore, the resistance becomes large.

Note that the recessed portions of all of the plurality of circumferential grooves 74 formed in the transitional region 73 become guides, and therefore, function so as to guide the oil dispersed into the relief gap due to the back flow (oil flows "K" in FIG. 9A) to the direction of the main cylindrical surface portion 71.

Here, for comparison with the operation of the present invention, the operation of the prior art will be described with use of FIGS. 11A to 14. As shown in FIGS. 11A to 14, in the case of the conventional sliding bearing (in the case of a conventional crush relief 170 formed on the inner circumferential surface of a half bearing), the lubricating oil is supplied to the gap (bearing gap) between the inner circumferential surface of the sliding bearing and the outer circumferential surface of the crankpin from the discharge port 5c for the lubricating oil of the crankpin 5. However, the foreign matters having the sizes larger than the bearing gap and mixed in the lubricating oil hardly advance into the bearing gap, and are easily discharged in the crush relief 170.

The foreign matters having the large sizes advance into the relief gap when the discharge port 5c for the lubricating oil of the rotating crankpin 5 communicates with the crush relief 170 on the front side in the crankpin 5 rotational direction of one half bearing 131. Since the inertial force to advance in the rotational direction of the crankpin 5 acts on the foreign matters discharged from the discharge port 5c for the lubricating oil of the rotating crankpin 5, the foreign matters thereafter flow to the front side in the rotational direction of the crankpin 5, and tend to advance to the region to which the discharge port 5c on the circumferential end portion side of the crush relief 170 on the rear side in the crankpin 5 rotational direction of the other half bearing 132 advances.

The crush relief 170 which is formed at the circumferential end portion of the half bearing 132 located on the rear side in the rotational direction of the crankpin 5 is formed so that the relief gap becomes narrower toward the front side in the rotational direction of the crankpin 5. Therefore, the foreign matters contact the surface of the crankpin 5 in a portion where the relief gap becomes small, and tend to be easily forced into the surface of the crush relief 170.

The foreign matters which are forced into the range of the crush relief 170 surface to which the discharge port 5c for the lubricating oil on the crankpin 5 surface advances are caught by the inner side surface (edge portion) on the rear side of the discharge port 5c in the crankpin 5 rotational direction are dragged to the inner circumferential surface side of the half bearing 132, and easily cause the problem of damaging the inner circumferential surface of the half bearing 132 when the discharge port 5c of the crankpin 5 surface passes.

Figure 14:
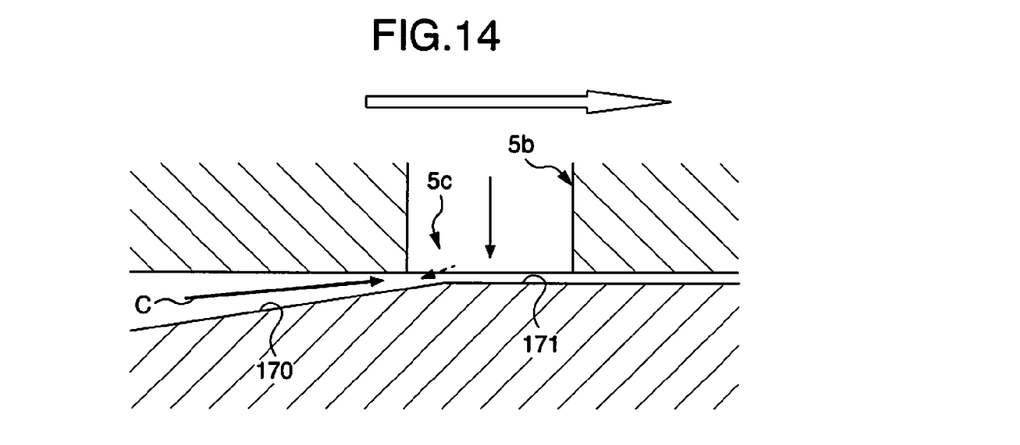
FIG. 14 is an enlarged operation view explaining the operation of the half bearing of the prior art.

As shown in FIG. 14, in the conventional crush relief 170, the back flow of the lubricating oil of the crankpin 5 as in the present invention is difficult to be formed. The reason thereof is that in the case of the conventional crush relief 170, the gap between the surface of the crush relief 170 and the surface of the crankpin 5 is very small in the vicinity of the circumferential end portion of the crush relief 170 on the rear side in the rotational direction of the crankpin 5, and therefore, most of the lubricating oil in the gap of the relief end portion is easily fed to the front side in the circumferential direction by accompanying the surface of the rotating crankpin 5.

Furthermore, the reason is that at the end portion of the crush relief 170, a wedge-shaped gap in which the gap is narrowed in the flow direction of the lubricating oil is formed, and therefore, when the lubricating oil flows in the gap, the pressure of the lubricating oil rises to be high pressure due to the hydrodynamic wedge action. In particular, in the case in which the circumferential groove is formed in the inner circumferential surface of the half bearing, a back flow hardly occurs even when the discharge port 5c on the surface of the crankpin 5 comes out of the end portion of the crush relief 170 on the rear side in the rotational direction of the crankpin 5.

Meanwhile, as a measure of dealing with the foreign matters which get mixed into the lubricating oil in a half bearing for a crankshaft of an internal combustion engine in which the crush reliefs are formed at both circumferential end portions of the inner circumferential surface, there is known the proposal of forming an axial groove at a position adjacent to a crush relief which is formed in at least the circumferential end portion of the inner circumferential surface of the half bearing which is located on the rear side in the relative rotational direction of a crankshaft, and the inner circumferential surface of the half bearing. The axial groove is formed throughout an entire region in the width direction of the inner circumferential surface of the half bearing, and therefore, the foreign matters can be discharged to an outside of the bearing together with the lubricating oil through the axial groove (see JP-A-2012-002247).

However, when the above proposal is applied to the connecting rod bearing 3 for an internal combustion engine, foreign matters are hardly mixed into the inner circumferential surface of a half bearing, but during the operation time of the internal combustion engine, oil leakage to the outside of the bearing from the axial groove always occurs. Namely, not only in the state in which the discharge port 5c of the crankpin 5 and the axial groove communicate with each other, but also in the states other than this, the oil flow flowing in the relief gap by accompanying the surface of the crankpin 5 advances into the axial groove and is easily discharged to the outside of the bearing. In recent years, in the internal combustion engines in which the oil pumps are miniaturized, and the supply amount of the lubricating oil to the bearings is reduced, the problem of the oil supply amount to the inner circumferential surfaces being insufficient sometimes arises, particularly in the half bearings of JP-A-2012-002247.

(Effect)

Next, effects of the connecting rod bearing 3 of the present embodiment will be listed and described.

(1) A connecting rod bearing 3 of the present embodiment is a connecting rod bearing 3 which supports a crankpin 5 of an internal combustion engine, a discharge port 5c which supplies the lubricating oil to between the crankpin 5 and the connecting rod bearing 3 is formed in the crankpin 5, and the connecting rod bearing 3 is composed of a pair of half bearings 31 and 32 which constitute the connecting rod bearing 3. The half bearing 31 has a main cylindrical portion 71, crush reliefs 70 and transitional regions 73.

The crush relief 70 is formed so that when an inner circumferential surface of the main cylindrical portion 71 is extended over the crush relief 70 and is referred to as a virtual inner circumferential surface, the depth D1 from the virtual inner circumferential surface in a position of an end surface 72 in the circumferential direction of the half bearing 31 is larger than the depth D2 from the virtual inner circumferential surface in a position where the crush relief 70 connects with the transitional region 73, a plurality of circumferential grooves 74 extending in the circumferential direction throughout the entire length in the circumferential direction are provided in the main cylindrical portion 71, and the plurality of circumferential grooves 74 are also continuously extended in the transitional region 73.

By the configuration like this, the oil flow in an opposite direction that is injected from the discharge port 5c becomes the resistance to the oil flow in which the foreign matters are mixed, and therefore, the foreign matters hardly advance into the region to which the discharge port 5c advances. Accordingly, the foreign matters are prevented from being deposited in a concentrated manner in a passage region of the discharge port 5c of the crankpin 5. Therefore, the problem that the foreign matters are dragged by an edge portion of the discharge port of the crankpin 5 and damage the inner circumferential surface of the main cylindrical portion 71 of the half bearing 32 hardly occurs. Note that the foreign matters which are dispersed to an outside of the passage region of the discharge port 5c on the surface of the crankpin 5 become easily forced into the transitional region 73 outside the passage region of the discharge port 5c on the surface of the crankpin 5. However, since the discharge port 5c does not pass a region outside the passage region as a matter of course, the foreign matters are not dragged into the inner circumferential surface of the half bearing 32 by the inner side surface (edge portion) on the rear side of the discharge port 5c, and therefore, do not damage the inner circumferential surface.

Furthermore, the measure of dealing with foreign matters of the present embodiment do not involve increase in the leakage amount of the lubricating oil unlike the technical idea in which the foreign matters are positively discharged with the lubricating oil to the outside of the bearing as in JP-A-2012-002247 or the like. Namely, the disadvantage that immediately after a back flow occurs, most of the injected lubricating oil flows into the axial groove so as to be discharged to the outside of the bearing to cause shortage of oil supply to the main cylindrical surface can be prevented. In this manner, in the connecting rod bearing 3 of the present embodiment, damage to the bearing inner circumferential surface by the foreign matters hardly occurs, and the leakage amount of the lubricating oil can be reduced.

(2) If the length L2 in the circumferential direction of the transitional region 73 is 5 to 75% of the diameter K1 of the discharge port 5c in the surface of the crankpin 5, the injection flow of the lubricating oil is easily dispersed, and the foreign matters are easily discharged.

(3) If the length L2 in the circumferential direction of the transitional region 73 is 10 to 60% of the diameter K1 of the discharge port 5c in the surface of the crankpin 5, the injection flow of the lubricating oil is more easily dispersed, and the foreign matters are more easily discharged.

(4) The circumferential groove 74 is formed to be 0.5 to 6 μm in the depth DG, and 0.05 to 0.5 mm in the width WG, whereby the holding performance of the lubricating oil which flows into the circumferential groove 74 can be enhanced, and the leakage amount can be suppressed.

(5) The length L1 in the circumferential direction of the crush relief 70 is 75% or more of the diameter K1 of the discharge port 5c in the surface of the crankpin 5 from the circumferential end portion of the half bearing 31 toward the circumferential central portion, whereby the foreign matters discharged from the discharge port 5c are restrained from reaching the transitional region 73 of the other half bearing 32 before the discharge port 5c catches up therewith, and the back flow can act on the foreign matters substantially reliably.

The embodiment of the present invention is described in detail above with reference to the drawings, but the specific configuration is not limited thereto, and design changes cab be included in the present invention without departing from the gist of the present invention.

For example, without being especially limited in the embodiment, axial grooves (chamfer in the shape of an inclined surface) which continuously extend in the axial direction can be formed at the edge portions at the inner surface side of both circumferential end portions of the half bearing 31. By forming the axial grooves in this manner, the foreign matters can be discharged to the outside of the bearing through the axial groove.

Further, in the embodiment, the case of forming no groove on the crush relief surface is described, but the present invention is not limited thereto, and a plurality of circumferential grooves can be formed on the surface of the crush relief 70. In that case, the circumferential grooves may be continuously extend to the circumferential grooves 74 of the transitional region 73 and the main cylindrical portion 71, or different circumferential grooves which do not continuously extend may be formed.

The invention claimed is:

1. A connecting rod bearing for supporting a crankpin of an internal combustion engine, the crankpin having a discharge port on its surface for supplying lubricating oil to a gap between the crankpin and the connecting rod bearing, the connecting rod bearing comprising a pair of half bearings, wherein each half bearing comprises a main cylindrical portion including a central portion of the half bearing in a circumferential direction, crush reliefs formed at both end portions of the half bearing in the circumferential direction so that the thickness of walls of the end portions is smaller than that of a wall of the main cylindrical portion, and a transitional region formed between at least one of the crush reliefs on a rear side in a rotational direction of the crankpin and the main cylindrical portion so that the thickness of a wall of the transition region decreases toward the crush relief, the crush reliefs are each formed so that when setting a virtual inner circumferential surface by extending an inner circumferential surface of the main cylindrical portion over the crush relief, the depth from the virtual inner circumferential surface at a position of an end surface of the half bearing in the circumferential direction is larger than that at a position where the crush relief connects with the transitional region, and a plurality of circumferential grooves are provided in the main cylindrical portion to continuously extend in the circumferential direction throughout an entire length in the circumferential direction, and are continuously formed also in the transitional region.

2. The connecting rod bearing according to claim 1, wherein a length of the transitional region in the circumferential direction is 5% to 75% of a diameter of the discharge port on the crankpin surface.

3. The connecting rod bearing according to claim 2, wherein the length of the transitional region in the circumferential direction is 10% to 60% of the diameter of the discharge port on the crankpin surface.

4. The connecting rod bearing according to claim 1, wherein each circumferential groove is formed to be 0.5 μm to 6 μm in depth, and 0.05 mm to 0.5 mm in width.

5. The connecting rod bearing according to claim 1, wherein a length of each crush relief in the circumferential direction from the end portion of the half bearing toward the central portion in the circumferential direction is 75% or more of a diameter of the discharge port on the crankpin surface.

\* \* \* \* \*